United States Patent [19]
Gallant

[11] 4,171,034
[45] Oct. 16, 1979

[54] LIQUID LUBRICATED ROLL WITH RECIRCULATION SYSTEM

[75] Inventor: James O. Gallant, Rehobeth, Mass.

[73] Assignee: SW (Delaware), Inc., Providence, R.I.

[21] Appl. No.: 873,081

[22] Filed: Jan. 27, 1978

[51] Int. Cl.$^2$ .............................................. F16N 7/32
[52] U.S. Cl. ................................ 184/6.24; 184/6.26; 308/187
[58] Field of Search ............ 308/187; 184/6.26, 11 R, 184/6.24; 29/148.4 L; 226/194

[56] References Cited

U.S. PATENT DOCUMENTS

| | | | |
|---|---|---|---|
| 561,028 | 5/1896 | Perry | 184/70 X |
| 1,973,710 | 9/1934 | Ivitsky | 308/117 |
| 3,666,049 | 5/1972 | Kern et al. | 184/6.26 X |
| 3,746,129 | 7/1973 | Knapp et al. | 184/6.26 |
| 3,854,646 | 12/1974 | Dörfel et al. | 226/194 X |
| 4,018,302 | 4/1977 | Brown | 184/6.26 |

Primary Examiner—David H. Brown
Attorney, Agent, or Firm—Kenway & Jenney

[57] ABSTRACT

A curved roll having spools rotatable about an axle on bearings lubricates the bearings with an annular body of liquid lubricant formed on the interior of the spools as they rotate. A pair of scoops located at opposite ends of the axle and facing in opposite rotational directions recirculate lubricant from the annulus through a flow path exterior to the roll and which includes a filter, a flow control device, pressure and flow gauges and a valve for adding and draining the lubricant from the system. The lubricant in the annulus is distributed uniformly along the roll by level control scoops that are each positioned in a compartment defined by an adjacent pair of bearings, the axle and the spools. Excess liquid in one compartment is skimmed by the associated up-take scoop and directed to lubricant reservoir; whereas in a compartment having insufficient lubricant, an oppositely directed drain scoop receives oil from the reservoir. Slots formed in the spools over the bearings and a pattern of grooves machined on the outer surface of the spool provide a liquid flow path for axial redistribution of the liquid when the roll is rotating. The groove pattern and bearing shields prevent the lubricant from flowing between compartments when the roll is stationary. A vent line communicates between the compartments and atmosphere to relieve pressure differences due to thermal cycling. Check valves and an air dryer connected in the vent line limit the intake of moisture.

21 Claims, 8 Drawing Figures

LIQUID LUBRICATED ROLL WITH RECIRCULATION SYSTEM

BACKGROUND OF THE INVENTION

This invention relates in general to liquid lubricated rolls. More specifically, it relates to a liquid lubricated roll that automatically recirculates the lubricant without an external power source and automatically controls the distribution and level of the lubricant along the roll.

Curved rolls are commonly used in processing paper, textiles and other sheet materials. They typically have a set of generally cylindrical hollow spools rotatable on antifriction bearings that are spaced along a stationary, curved axle. Generally, an elastomeric sleeve is pulled over the spools to place a continuous, smooth surface in contact with the sheet material.

Lubrication of the bearings is an important factor affecting life, reliability and performance of the roll. Conventional rolls lubricate the bearings by packing them with grease. This system, however, does not offer sufficient lubrication at very high speeds (e.g. 6,000 feet per minute FPM). Also, the lubricant cannot be conveniently replaced without a complete disassembly of the roll.

Lubrication by a liquid such as oil, in contrast, can provide excellent lubrication of the bearings at high speeds. Liquid lubricants, however, present a variety of other problems. First, the roll must include a system for directing the lubricant onto the bearings. One system described in U.S. Pat. No. 3,666,049 to Kern utilizes a number of spray nozzle fittings located within the roll adjacent the bearings. While the fittings do lubricate the bearings, they are costly, difficult to service, and require an external pressure source to force the lubricant through the fittings. If even one fitting should clog or otherwise malfunction, or if there is even a temporary failure in the pressurized supply of lubricant, the affected bearings will quickly become damaged or destroyed. Further, oil must constantly drain from the roll and the Kern lubrication system does not control condensation produced when the roll cools.

Another liquid lubrication system described in U.S. Pat. No. 3,746,129 to Knapp introduces a quantity of the lubricant to the interior of the roll from a standpipe. The centrifugal force of the rotating spools forces the lubricant against the interior surface of the spools to form a rotating annular body of liquid. Projections on the axle extend into the annular body of lubricant to produce a lubricating spray or mist. Passages in the spools that span the bearings allow an axial flow of the lubricant past the outer races of the bearings. One problem with a supply of lubricant inside the roll is that an excess of the lubricant can flood the bearings. Flooding is undesirable because it can heat and damage both the bearings and the lubricant and it requires an increased torque to turn the roll. To control this problem, Knapp employs four co-planar scoops that skim the liquid annulus. Each scoop has a separate drain line that feeds to a common drain pipe.

While this lubrication system functions well, it nevertheless has several shortcomings. When the roll stops, the lubricant collects at the low ends of the roll. On start up, this maldistribution floods the end bearings and insufficiently lubricates the central bearings. Moreover, the spool passages and the four scoops are relatively slow in establishing an even distribution of the lubricant at the proper level. Another problem is that there is no recirculation of the oil. Once the initial supply is distributed, no substantial quantity of lubricant is added or removed from the roll. If additional lubricant is simply poured into the standpipe while the roll is running, it floods the bearings. Thus, it is not feasible to add, drain or clean the oil during operation. Also, while a pressure build-up on the roll can vent through the standpipe, there is no system for controlling the formation of condensation as the roll cools.

U.S. Pat. No. 4,018,302, commonly assigned with the Knapp patent and this application, discloses barrier rings located adjacent the bearings which allow the lubricant to flow past the bearings when the roll is rotating. While these rings avoid flooding of the end bearings of a curved roll when the roll stops, they do not provide recirculation of the lubricant and to some extent they restrict the axial redistribution and overall level control of the lubricant.

It is therefore a principal object of this invention to provide a high speed, liquid lubricated roll with a recirculation system for the lubricant that does not require an external power source.

Another object is to provide such a roll with the capability to add, drain and clean lubricant and to control the flow rate of the lubricant.

A further object of the invention is to provide a curved liquid lubricated roll that continuously lubricates each bearing without flooding at high speeds (i.e., above 1600 FPM).

Yet another object is to provide such a curved roll that rapidly distributes the lubricant along the roll to all of the bearings and controls the level of the lubricant throughout the roll.

Still another object of the invention is to provide a roll with a liquid lubricant recirculation, distribution and leveling system that relieves pressure differences in the roll as it heats and cools and restricts the formation of condensation in the roll.

A still further object is to provide a liquid lubricated roll with lubricant recirculation, distribution and leveling system that is independent of the speed and direction of rotation of the roll.

Another object is to provide a roll with the foregoing advantages that is reliable, comparatively easy to maintain and has a relatively long product life.

SUMMARY OF THE INVENTION

A liquid lubricated roll according to the invention has an axle extending in a generally horizontal direction that carries an axially spaced set of anti-friction bearings and a set of generally cylindrical, hollow spools, covered by an elastomeric leak-proof sleeve, rotatably mounted on the bearings. The spools, sleeve and the axle define an annular passageway that is subdivided into compartments by the bearings. A supply of a liquid lubricant is introduced into the passageway to lubricate the bearings. Rotation of the spools develops a centrifugal force that causes the lubricant to form a rotating annular layer or body of the liquid on the interior surfaces of the spools. Stationary turbulence pins spaced along the axle project into the rotating annulus of lubricant to generate a spray or mist that lubricates each bearing continuously during rotation.

A recirculation system for the lubricant includes a pair of radially extending scoops located at opposite ends of the roll and facing in opposite directions of rotation. Each recirculation scoop has one end immersed in the liquid annulus and the other end in fluid communication with a longitudinally extending passage formed in the axle. One of the scoops takes up lubricant from the annulus and the other scoop feeds lubricant to the annulus. The passages preferably are connected in series with a filter to clean the lubricant, a device for controlling the flow rate, and gauges to measure pressure and flow rate. A three-way valve in this recirculation system is convenient for adding or draining lubricant.

To distribute the lubricant axially along the roll and to control its level (the depth of the rotating annulus), a first set of axially spaced scoops extends radially from the axle to the annulus. At least one scoop of this set occupies each compartment of the passageway. The scoops have a lubricant intake portion adjacent the annulus. The radial height of the scoops determines the level of the annulus by skimming off excess lubricant and directing it to a first channel formed in the axle and interconnecting all of the scoops of this set. Some distribution occurs when a scoop associated with a compartment rich in lubricant pumps, via the common channel, lubricant to a scoop associated with a compartment lacking sufficient lubricant. Distribution also occurs through a liquid reservoir external to the roll and a second set of level control scoops in like number and kind to the first set but facing in the opposite rotational direction. The scoops of the second set preferably are equiangularly spaced from both the scoops of the first set and a row of the turbulence pins. The second set of level control scoops communicate with an associated second common channel formed in the axle. Separate conduits connect both common channels to the reservoir. Because the reservoir is located at or above the centerline of the roll, lubricant will gravity feed from the reservoir, through a restricted orifice, to the second or feed set of scoops. On the other hand excess oil not distributed immediately between the up-take scoops will be pumped by them into the reservoir. The distribution of roll rotation determines which set of scoops operates as the feed scoops, and which as the take-up scoops.

A pair of diametrically opposed bypass slots extends through the interior or "common" spools. Each slot spans an associated bearing to provide, in combination with a pattern of grooves formed on the outer surface of each spool, another lubricant flow path for axially distributing the lubricant during rotation. These flow paths are particularly useful for rapid distribution on start up and for a recirculation flow. To prevent flow through the bypass slots when the roll is stationary, each slot communicates at one end with a circumferential groove formed on the outer surface of each spool and a pair of diametrically opposed, longitudinally extending grooves. The longitudinal grooves are angularly spaced from the slots and in fluid communication between the circumferential groove and the end of the spool.

The roll also includes a vent system between the annular passageway and atmosphere. The system typically includes a passage in the axle to the passageway, an isolated vapor expansion chamber in the liquid reservoir, a network of check valves, and an air dryer. As the roll heats, air pressure is relieved to atmosphere through one of the check valves. As the roll cools, negative pressure in the roll is relieved by air drawn in through a second, oppositely directed check valve and the dryer. This minimizes the formation of condensation in the roll.

These and other features and objects of the invention will be more fully understood from the following detailed description of the illustrated embodiments which should be read in light of the accompanying drawings.

DETAILED DESCRIPTION OF THE ILLUSTRATED EMBODIMENTS

Figure 1:
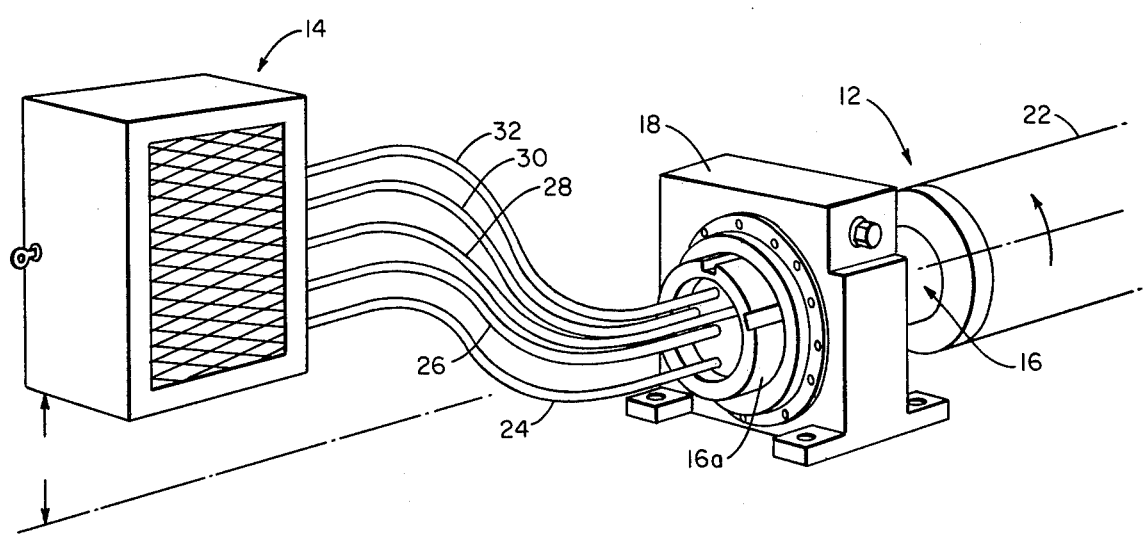
FIG. 1 is a perspective view of the tending end of a liquid lubricated curved roll constructed according to the invention and including its hydraulic support package.
Figure 3:
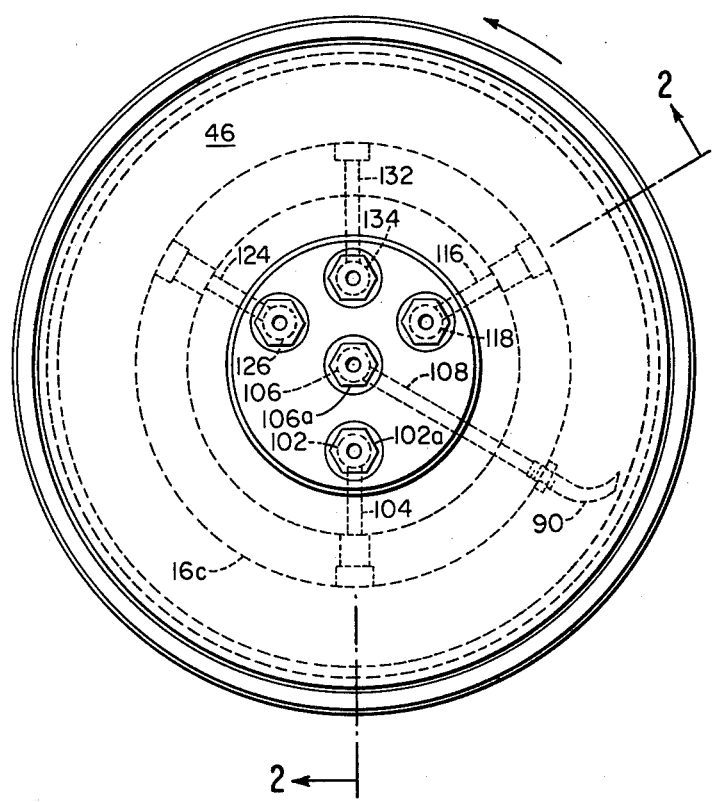
FIG. 3 is a view in side elevation taken along the line 3—3 of FIG. 2A.

FIG. 1 shows an oil lubricated, curved roll 12 that employs the features of this invention including an external hydraulic support package 14. While this invention is described with reference to its preferred embodiment, which is an oil lubricated, curved roll suitable for expanding wide webs of sheet material such as textiles, papers and foil, it will be understood that the liquid lubricant is not restricted to oil and that the invention can be applied to straight rolls and rolls used for other applications. The roll 12 has a generally horizontally extending, upwardly bowed axle 16 supported at a "tending" end adjacent the hydraulic support package 14 in an end bracket 18, and at its opposite "non-tending" end in an end bracket 20. An elastomeric sleeve 22 forms the outer, web-contacting surface of the roll. A set of flexible conduits 24, 26, 28, 30 and 32 provides fluid communication between the interior of the roll and the support package 14. For reasons which will become apparent, the support package 14 in the illustrated roll system is elevated with respect to the centerline of the roll.

With reference to FIGS. 2-6, the axle 16 has a generally solid tending end section 16a, a generally solid non-tending end section 16b and a hollow central section 16c joined to the end sections at welds 34, 34. Each end section has a portion of reduced outer diameter 16d that is held in a pair of spherical bearing members 35 that pivot to rotatably adjust the plane of the bowed axle and hence the roll. The axle carries a series of axially spaced anti-friction bearing assemblies 36. Each assembly has an inner race 36a, an outer race 36b and balls 36c held between the races. The outer races 36b are each secured to one spool indicated generally by 38 and including two end spools 38a located at the ends of the roll and intermediate "common" spools 38b. Each common spool 38b has an interior recess 44 that locates the spool on the outer bearing race 36b. The inner bearing races 36a are located on the axle by spacer collars indicated generally by 40 and including end spacer collars 40a and 40b at each end of the roll. The spools 38 are axially spaced slightly by a clearance 42 to permit unrestricted rotation of the sleeve when the roll is curved. The sleeve 22 surrounds and bears resiliently against the spools. The bearings radially space the spools from the axle to define an annular passageway 46 that is subdivided into annular compartments 46a defined, in addition, by the bearing assemblies 36.

Figure 2A:
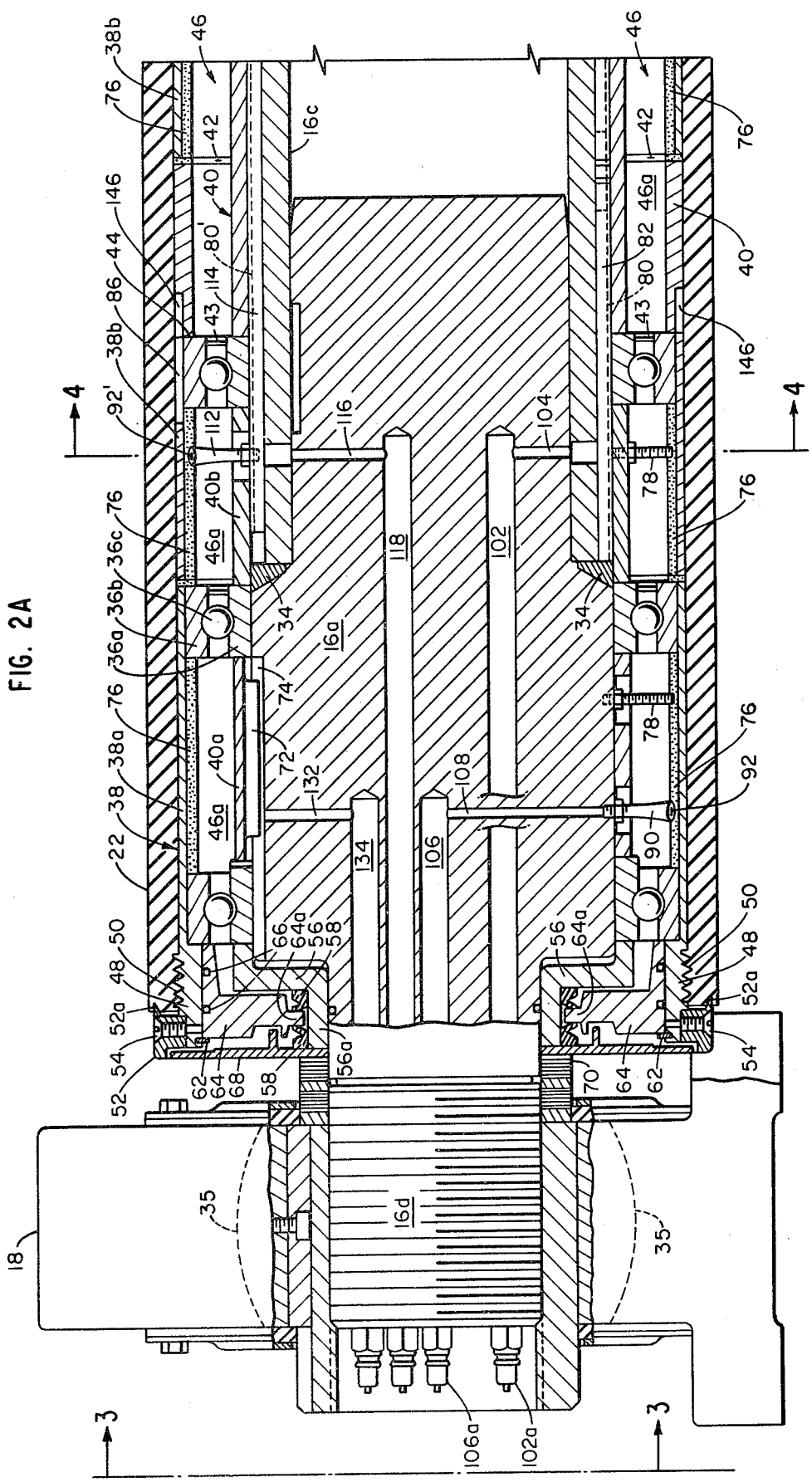
FIGS. 2A and 2B are sectional views in partial elevation of the tending end and nontending end and, respectively, of the roll shown in FIG. 1 taken along the line 2—2 of FIG. 3.

With particular reference to FIG. 2A, the end spool 38a has a radially enlarged edge portion 48 that abuts the end bearing assembly. The outer surface of the portion 48 carries threads 50 that mate with corresponding threads formed on the interior end surface of the sleeve 22 to secure the sleeve and produce a fluid tight end seal of the sleeve to the spool 38a. An end cap 52 has a flange 52a that engages the end of the sleeve to restrict it from lifting from the end spool.

Machine screws 54 secure the end cap to the spool. The end seal provided by the threaded engagement and the end cap reliably blocks the passage of contaminants, moisture, and corrosive fluids commonly found in the roll environment to the interior of the roll where they would damage the bearings and significantly reduce the life of the roll. The seal also blocks the escape of oil from the roll, particularly when the roll is operated at high speeds and the oil becomes heated.

It is likewise important to provide a reliable running seal between the rotating end spool 38a and a stationary member, in this case a retainer collar 56. An opposed pair of V-ring seals 58 is mounted on a reduced diameter portion 56a of the collar 56. An O-ring 60 held in a circumferential groove formed on the axle portion 16d blocks fluid flow between the collar and the axle. An internal snap ring 62 holds a race 64 against the outer race 36b of the end bearing and the inner surface of the enlarged end spool portion 48. O-rings 66, 66 held in grooves formed on the outer surface of the race 64 block a fluid flow along that surface.

The running seal is a "double-V" seal established by the resilient lips of the V-ring seals 58, 58 bearing lightly against an inwardly directed flange 64a of the race 64. If there is an overpressure or underpressure condition in the roll, one of the V-ring seals 58 will be pressed with increased force against the race. In contrast to conventional V-type running seals used in rolls, this double-V seal does not require lubrication and does not open due to centrifugal forces at high speeds. As with the end seal for the sleeve, failure of the double-V running seal will result in damage or more rapid deterioration of the roll due to the entrance of contaminants, moist ambient air, or corrosive fluids. An end shield 68 that spans the end cap 52 also retards the passage of contaminants and corrosive fluids to the interior of the roll.

Structures at the tending end of the roll, shown in FIG. 2A, also hold the bearing assemblies 36 and spacer collars 40 in a stacked relationship on the axle 16. The end bracket 18 is threaded on the axle portion 16d which compresses a set of wave spring washers 70. The spring force generated by this compression acts through the end shield 68 and the retainer collar 56 to compress the bearing assemblies 36 and the spacer collars 40. This axial spring compression supports the inner races 36a of the bearings with respect to the axle, prevents the application of an excessive compression force, and maintains a uniform compression as these parts wear and seat themselves. The collar 40a is also secured against rotation about the axle by a key 72 that engages a keyway 74 formed in the outer surface of the axle section 16a.

With respect to FIGS. 2-6 and FIG. 7, a principal feature of this invention is a system for continuously lubricating the bearing assemblies 36 with oil that is recirculated and distributed axially along the roll among the compartments 46a at a preselected optimal level. The system provides an improvement over the prior art general approach to lubricating the bearings disclosed in the aforementioned U.S. Pat. No. 3,746,129 to Knapp. A supply of the oil is fed to the interior of the roll, and in particular to the annular passageway 46 between the axle and the spools and the sleeve. When the roll rotates, centrifugal forces throw the oil against the interior surfaces of the spools (and the sleeve at the clearances 42 between the spools) to form a hollow, cylindrical body or annulus 76 of oil. The liquid annulus 76 rotates together with the spools. Turbulence pins 78 secured to the axle extend radially with their tips projecting into the oil annulus 76 when it is at or above its preselected depth. As the rotating annulus strikes the tips of the pins 78, a spray or mist of the oil is generated which lubricates a neighboring bearing. (It should be noted that, a roll constructed in the manner described can be operated at a speed sufficiently slow so that the oil does not become distributed in an annular body, but rather remains gravity pooled within the roll. At these low speeds, the bearing elements are lubricated by passing through the oil pools.) The illustrated pins 78 are aligned in a longitudinal row and are axially spaced with one pin adjacent each bearing. The pins 78 are mounted either on the axle or on a U-shaped channel cover 80 that is seated in longitudinal channel 82 formed in the axle section 16c.

Figure 2B:
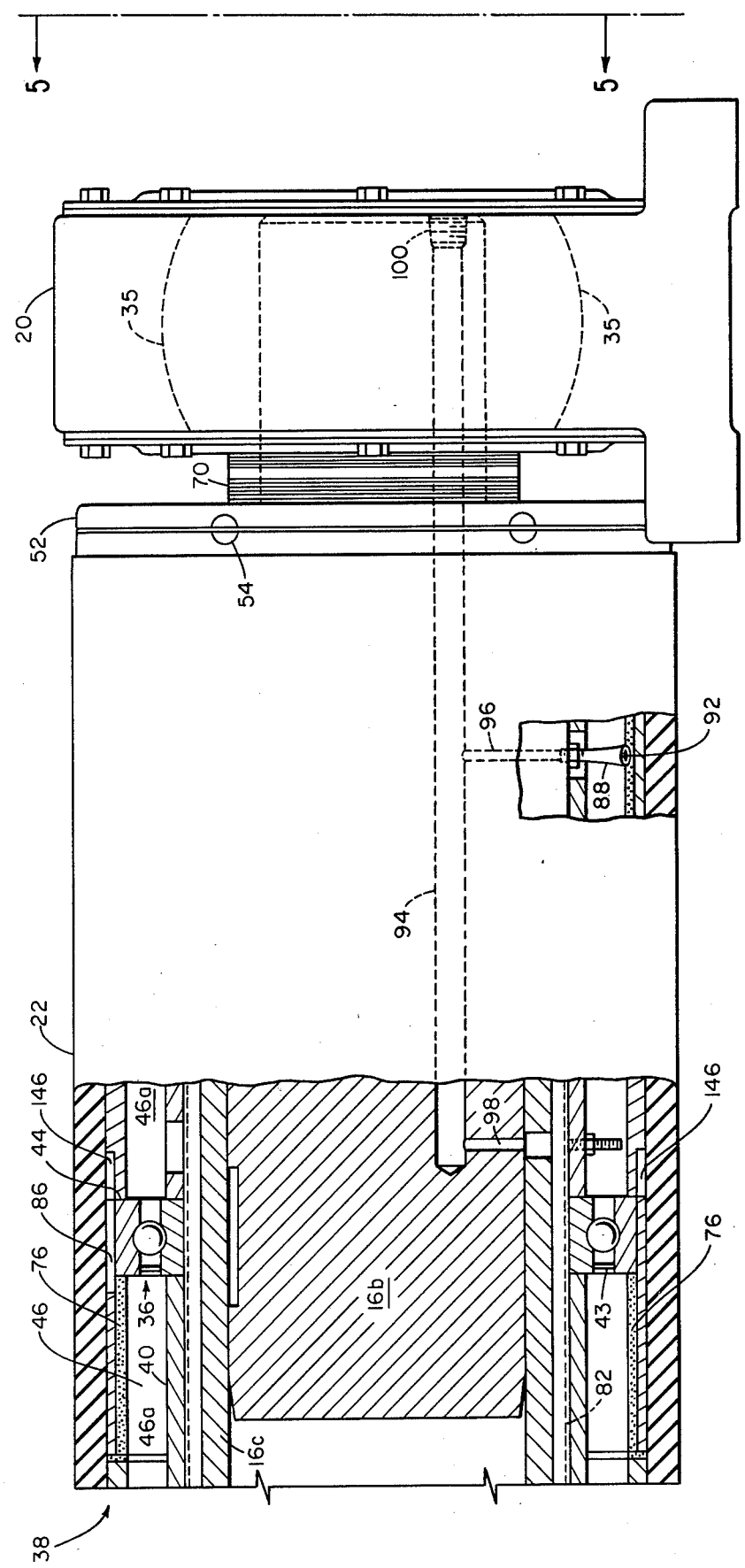

It should be noted that the rotating oil in the passageway 46 is not a continuous body over the full length of the roll, but rather is a series of short annuli each occupying one compartment 46a. Further, if the thick half of each spool (to the right of the associated bearing and the recess 44 as shown in FIGS. 2A and 2B) is higher than the thin half of the spool plus the overlying oil, then each "short" oil annulus extends axially over approximately half of each compartment. Nevertheless, for convenience these shorter annuli will be referred to collectively as a single continuous annulus of lubricating oil, particularly since the compartments are in fluid communication when the spools are rotating. Principal fluid communication is through a series of longitudinally extending slots 86 (FIG. 6) formed in the spools. The slots 86 are positioned over and slightly beyond the outer bearing races (except the two end races). Each spool has two diametrically opposed slots 86 for balance. The slots 86, as is discussed in more detail below, together with a pattern of grooves formed on the spool, provide an axial oil flow path that is particularly useful in distributing the oil supply along the roll on initial start-up. This flow path also allows a continuous recirculation of the entire supply of oil while the roll is operating.

Figure 5:
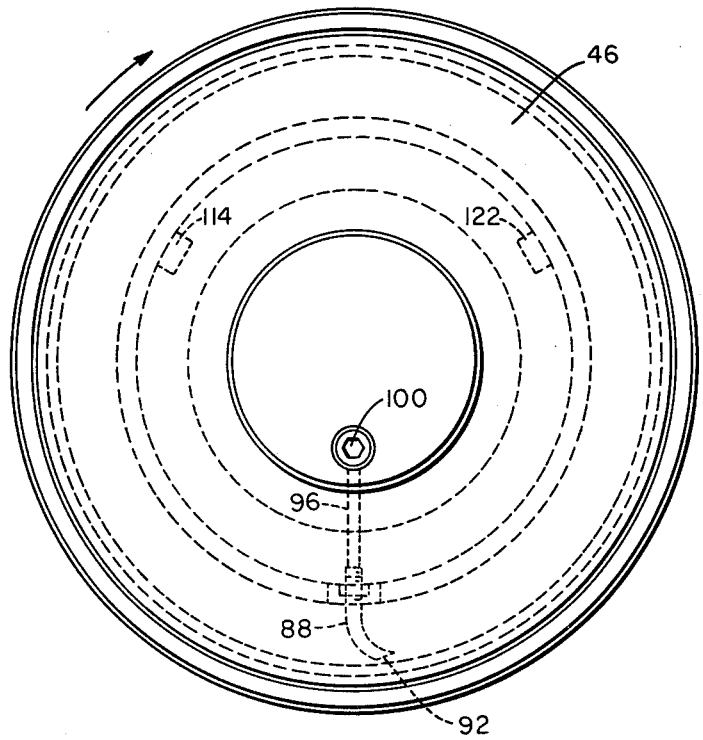
FIG. 5 is a view in side elevation taken along the line 5—5 of FIG. 2B.
Figure 6:
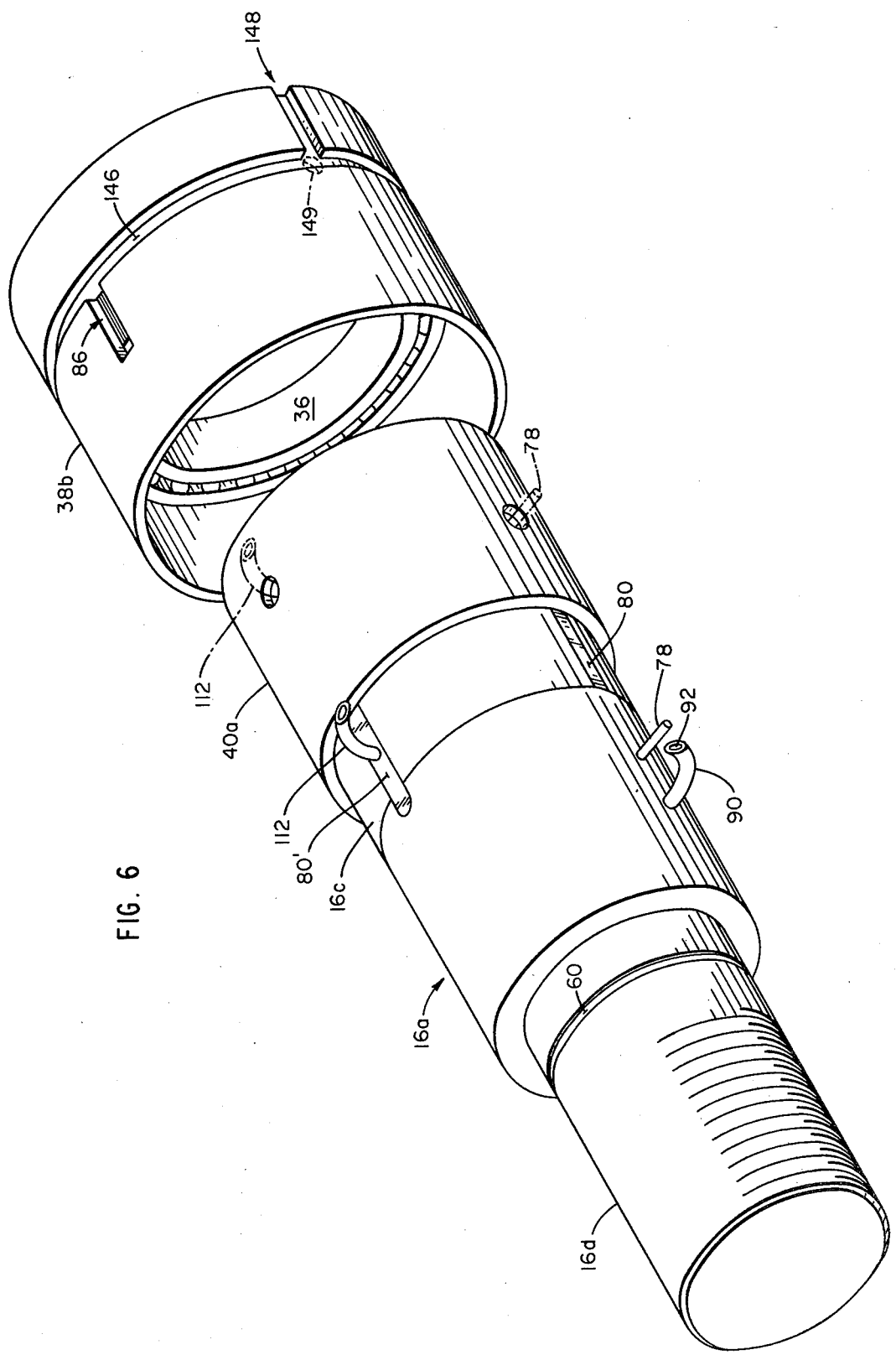
FIG. 6 is an exploded perspective view of the tending end of the roll axle, a bearing, a spacer collar and a spool shown in FIGS. 1-5.
Figure 7:
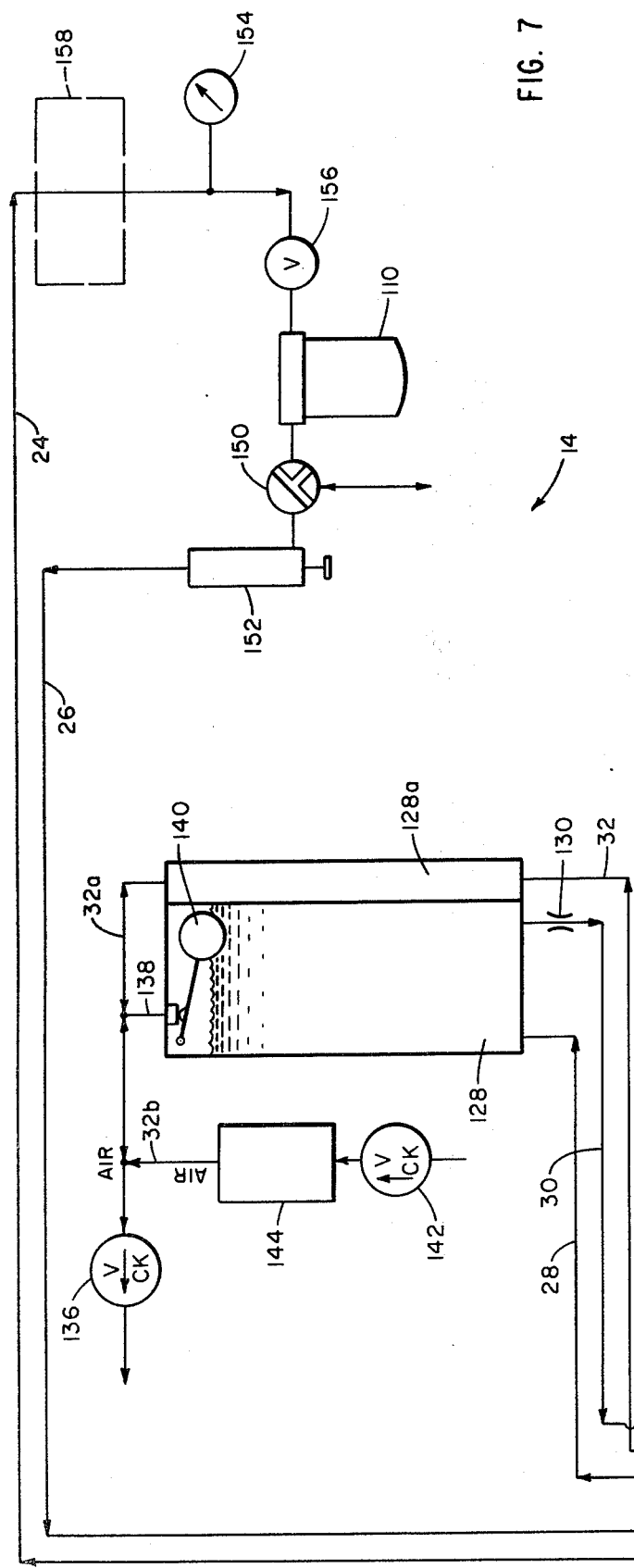
FIG. 7 is a schematic diagram of lubricant flow systems according to this invention employed in the roll and hydraulic support package shown in FIGS. 1-6.
Figure 7:
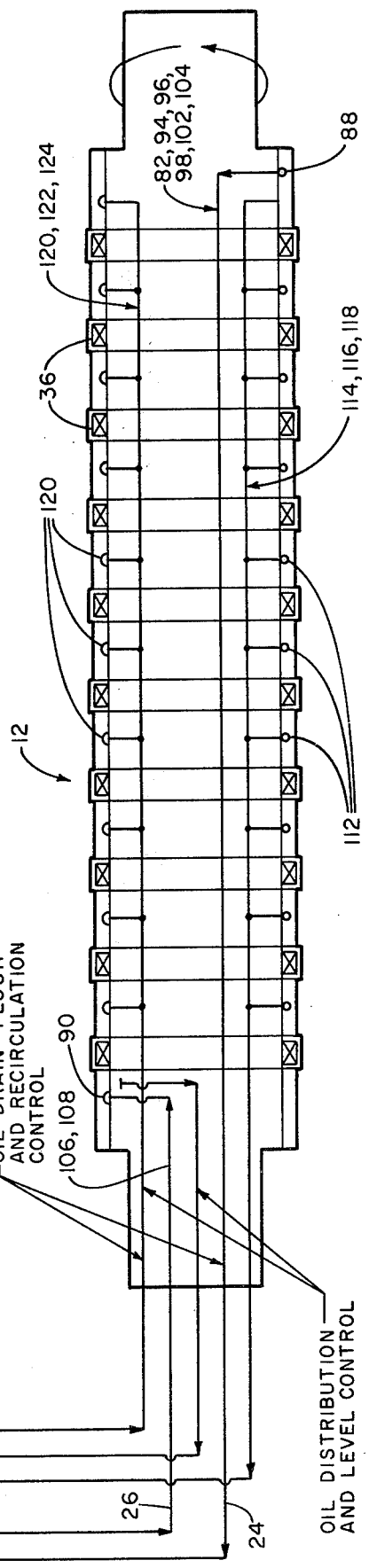

The recirculation system includes a pair of scoops 88 and 90 that have a generally tubular configuration and extend radially from the axle to the rotating oil annulus 76. Each scoop has a free end curved so that its oval end opening 92 is transverse to the direction of movement of the annulus. The scoop 88 is located at the non-tending end of the roll and faces the direction of rotation as shown in FIGS. 5 and 7. The scoop 90 is located at the tending end of the roll and faces away from the direction of rotation. The fixed end of the scoop 88 is in fluid communication with the channel 82 via a longitudinal passage 94 and radial passages 96 and 98 formed in the axial section 16b (FIG. 2B). The open end of the passage 94 is sealed with a threaded plug 100. At the tending end the channel 82 is connected to a longitudinal passage 102 via a radial passage 104, both formed in the axial section 16a. The scoop 90 is in fluid communication with another longitudinal passage 106 via a radial passage 108, both formed in the axle section 16a. The passages 102 and 106 terminate at the end face of the axle portion 16d in nipples 102a and 106a, respectively, which are connected to the lines 24 and 26, respectively.

When the spools are rotating in a counter-clockwise direction (viewed from the tending end and as shown) the scoop 88 takes up oil from the annulus 76 and directs it through the channel 82 and the conduit 24 to an oil filter 110 in the hydraulic support package 14. Oil leaving the filter 110 passes through a three-way manually-operated valve 150 and a device 152 that indicates and controls the oil flow rate through the recirculation system. The system also includes an oil pressure gauge 154 and a manual shut-off valve 156 connected in the conduit 24 before the filter 110. The oil cleaned by the filter 110 is returned to the roll 12 by the conduit 26 and the recirculation drain scoop 90. The recirculation loop or fluid path is completed by axial flow path provided by the slots 86. In summary, the recirculation fluid flow path includes the annulus 76, the scoops 88 and 90, the passages 82, 94, 96, 98, 102, 104, 106 and 108, conduits 24 and 26 and the elements 110, 150, 152, 154 and 156.

This recirculation system has several significant advantages. It does not require an external power source such as a pump or a pressurized air supply to circulate the oil. Rather, a motive fluid pressure developes in the stationary take-up recirculation scoop 88 by the momentum of the rotating oil entering the scoop. This system continuously cleans the oil, controls its flow rate, and measures the performance of the system through the pressure and flow gauges. In one position, the three-way valve allows oil to be added to the system through a hose (not shown) connected to an intake port of the valve. In another position, the valve, blocks flow to the return conduit 26 and directs the recirculating oil to a drain port. In a normal operating position, the valve blocks the intake and drain ports and directs the recirculating oil directly from the filter to the flow control and meter. The system thus can be conveniently flushed. Another advantage is that the operation is independent of the speed or direction of rotation of the roll. If the roll rotates clockwise (opposite to the direction shown in FIGS. 1, 3–5 and 7), the scoop 90 functions as the intake recirculation scoop and the scoop 88 becomes the drain recirculation scoop. The flow through the support package 14 is maintained in the same direction by simply switching the connection of the conduits 24 and 26 to the nipples 102a and 106a. As the roll speed increases, the oil pressure will also increase, but sufficient circulation of the oil will occur over the full range of operating speeds.

The oil redistribution and level control system includes a first set of level control scoops 112 that are identical in construction to the recirculation scoops 88, 90 except that they do not extend as far radially. More specifically, the scoops 112 have oval end openings 92' directed towards the rotating annulus that skims oil from the annulus 76 that is in excess of a preselected depth established by the spacing between the interior surface of the spool and the outer edge of the opening 92'. A typical value for this spacing is one-eighth inch. In contrast, for the recirculation scoops 88 and 90 this spacing is approximately one-sixteenth inch. Oil skimmed by the scoops 112 is guided down the interior of the scoops to a common, longitudinally extending channel 114 formed in the axle. The channel 114 includes a channel cover 80' similar in construction to the cover 80 for the recirculation channel 82. Oil in the channel 114 can be redistributed axially to compartments 46a having an insufficient quantity of oil via their associated scoops 112. However, the predominant oil flow in the channel 114 is to the conduit 28 by way of a radial passage 116 and a longitudinal passage 118 drilled in the axle section 16a. (It should be noted that a suitable opening 116a is also formed in the axle section 16c overlying the axle section 16a, and in general, where required, like openings are provided in the spacer collars 40 and the axle section 16c for the pins 78 and the scoops.)

Figure 4:
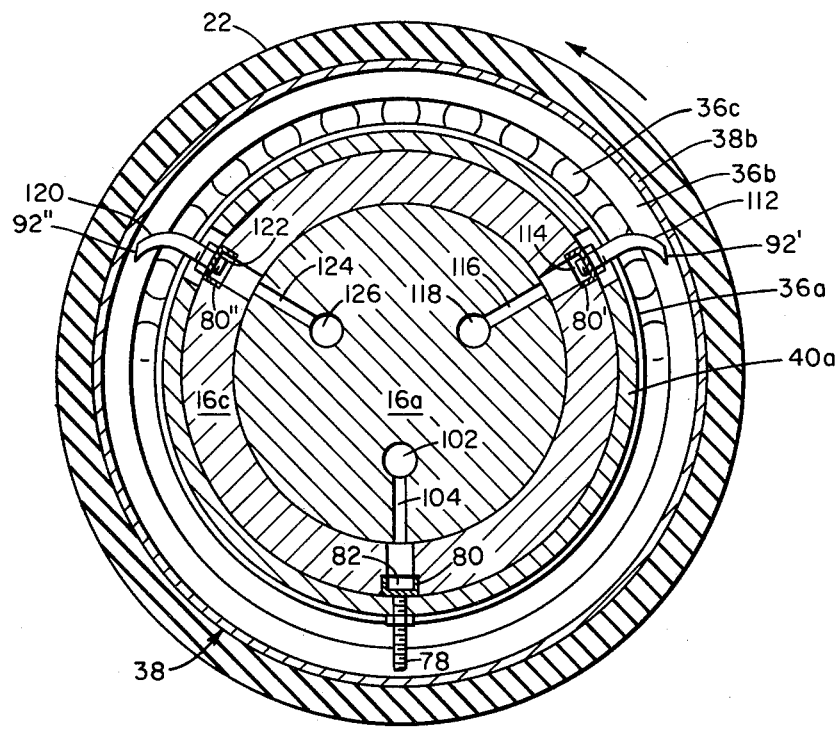
FIG. 4 is a view in vertical section taken along the line 4—4 of FIG. 2A.

The oil redistribution and level control system includes a second set of level control scoops 120 (FIG. 4) similar in number, construction and location to the scoops 112 except that their end openings 92" face away from the rotating annulus and they are each angularly spaced from the corresponding scoop 112 and the corresponding turbulence pin 78 (FIG. 4). As with the scoops 112, the scoops 120 each communicate with a common longitudinal channel 122 having a channel cover 80". A radial passage 124 and a longitudinal passage 126 formed in the axle section 16a place the channel 112 in fluid communication with the conduit 30.

With reference to FIG. 7, the excess oil skimmed by the "up-take" level control scoops 112 is guided by the passages 116 and 118 and the conduit 28 to an oil reservoir 128 in the hydraulic support package 14. The reservoir preferably has a level gauge (not shown). The height of the oil level is an indication of the performance of the level control system. Oil in the reservoir, which is at or above the centerline of the roll, is gravity fed through a restricted orifice 130 to the conduit 30 and the "drain" level control scoops 120. The scoops 112 and 120 communicating with one another through the reservoir 128 thus axially redistribute oil among the compartments 46a and maintain a uniform, preselected level of oil throughout the roll. In summary, the level and redistribution flow path includes the annulus 76, the scoops 112 and 120, the channels 114 and 122, passages 116, 118, 124 and 126, conduits 28 and 30 and the reservoir 128.

During operation, the roll 12 heats due to friction and ambient temperature increase causing the air in the roll to expand and develop an overpressure condition relative to atmospheric pressure. A radial passage 132 in the axle section 16a communicating between the passageway 46 and a longitudinal passage 134 connected to the conduit 32 provide a vent line to relieve this overpressure to atmosphere. The conduit 32 leads to the bottom of a vertically extending vapor expansion chamber 128a located in the oil reservoir 128 but isolated from the oil. A conduit 32a leads to atmosphere. A check valve 136 in the conduit 32a allows a fluid flow from the expansion chamber 128a to atmosphere, but blocks a reverse flow to prevent the intake of moist ambient air. The oil reservoir itself also vents through the conduit 32a and the check valve 136 through a conduit 138. A float valve 140 seals the intake end of the conduit 138 if the oil reservoir should overflow to prevent oil from entering the conduit 32a.

When the roll stops, it cools to create an underpressure condition in the roll relative to atmosphere. To relieve this condition, a conduit 32b supplies air at atmospheric pressure to the roll through the vent line 32a, 128a, 32 134, 132. The conduit 32b connects to the conduit 32a between the check valve 136 and the conduit 138. A check valve 142 and an air dryer 144 connected in series in the conduit 32b ensures that only dry air is drawn into the roll. As a result, the formation of condensation in the roll 12 is essentially eliminated as compared to prior art oil lubricated rolls. The pressure control provided by the vent line, the network of check valves and the air dryer significantly reduces the likelihood of drawing contaminants and corrosive fluids such as air moisture into the roll or forcing oil from the roll.

When the roll stops, it is also important to ensure that the oil in the roll does not run downhill to collect in pools at the ends of the rolls. As noted above, each bearing assembly 36 has a bearing shield 43 located on the side of the bearing opposite its associated turbulence pin 78. These shields block a direct flow of oil through the bearings between the compartments 46a when the roll is stationary. To block flow through the slots 86 when they come to rest near the bottom of the roll, a circumferential groove 146 is provided on the outer surface of each spool. The groove 146 is in fluid communication with one end of both slots 86 in each spool 38b. A diametrically opposed pair of longitudinal grooves 146 establish fluid communication between the circumferential groove and the "thick" end of the spool adjacent the clearance 42 between adjacent spools. The sleeve 22 seals the outer surfaces of the slots 86 and the groove pattern formed by the grooves 146 and 148. The longitudinal grooves 148 are preferably equiangularly spaced from the slots 86.

With this groove pattern, if the roll stops with one of the slots 86 near the bottom of the roll (a six o'clock position) oil will not bypass the bearings through the slots 86. This is because the quantity of oil in each compartment 46a is not sufficient to reach the level of the longitudinal grooves 148 situated near three and nine o'clock positions. On the other hand, if one of the longitudinal grooves is near the six o'clock position, oil will reach the circumferential groove 146 but, again, the quantity of oil is not sufficient to reach the level of the slots 86 near the six and nine o'clock positions. It should be noted that the function of the longitudinal grooves 148 can also be performed by a pair of radial holes 149 (FIG. 6) formed in the circumferential groove 146 at the same angular position as the grooves 148. Where bearing shields 43 are used (as opposed to baffles in the compartments 46a), the radial holes 149 are preferred.

By way of example, in operation, the lubrication system of a standard ten and one-half inch diameter roll is supplied with approximately three and one-half gallons of oil. When the roll is running the oil temperature typically ranges from room temperature to 225° F. The oil level in the reservoir 128 and the oil pressure indicated on the pressure gauge 116 vary with the roll speed. The oil level in the reservoir preferably ranges between half full at low speeds to almost completely full at high speeds. Typical oil pressures are two and one-half psi at a speed of 2,000 FPM and nineteen psi at 5,000 FPM. For best operation, the conduits 24, 26, 28, 30 and 32 should be relatively short (ten feet or less) and the support package 14 should not be more than approximately five feet above the roll centerline. Preferably the oil is renewed quarterly while the roll is running by adding a gallon of fresh oil and then draining a gallon of oil, both through the three-way valve 150. The removal rate also varies with roll speed. Typical removal rates are 0.4 gallons per hour (GPH) at 2,000 FPM and 1.12 GPH at 4,000 FPM.

While the invention has been described with reference to its preferred embodiment, it will be understood that various modifications will be apparent to those skilled in the art from the foregoing description and the accompanying drawings. For example, although the oil reservoir 128 functions to some degree as a heat exchanger, it is also contemplated to include a standard heat exchanger 158 in the recirculation flow path to cool the oil. It will be understood, however, that the effectiveness of the heat exchanger is to some degree dependent on the flow rate of the lubricant. Another example is that while the hydraulic support package 14 has been described as removed from the roll, it can be mounted directly on the tending end of the roll. Such modifications are intended to fall within the scope of the appended claims.

What is claimed and secured by Letters Patent is:

1. In a liquid lubricated roll having an axle means extending generally horizontally,
    a plurality of bearings axially spaced along said axle means, and
    a plurality of spools rotatably mounted on said bearings, said spools and said axle means defining therebetween an annular passageway containing said bearings, the improvement comprising,
    a liquid reservoir,
    first conduit means for guiding said liquid from said reservoir to said passageway to form a rotating annular body of liquid against the interior of said spools during their rotation,
    means for directing liquid from said rotating annular body onto said bearings,
    means for controlling the level of said rotating annular liquid body along said passageway, and
    means for recirculating said liquid during said rotation along a fluid flow path including said rotating annular liquid body and second conduit means having both of its ends in fluid communication with said annular liquid body.

2. A liquid lubricated roll according to claim 1 wherein said reservoir is located exterior to said roll and is arranged for containing liquid at at least the same gravitational level as the longitudinal centerline of said axle means.

3. A liquid lubricated roll according to claim 1 further comprising means for preventing an axial flow of liquid by said bearings when said spools are stationary.

4. A liquid lubricated roll according to claim 1 wherein said level control means comprises longitudinally extending channel means formed in said axle means and in fluid communication with said first conduit means and at least a first plurality of level control scoops arrayed along said axle means with at least one of said level control scoops disposed between adjacent pairs of said bearings, said level control scoops each having a first end in fluid communication with said channel means and a second end adapted to skim from said rotating annular body liquid which exceeds a predetermined thickness and is rotating in a first direction.

5. A liquid lubricated roll according to claim 4 further comprising a second set of said level control scoops and an associated channel means, formed in said axle means and in fluid communication with said first conduit means, the second ends of said second scoop set adapted to skim liquid from said rotating annular body when it exceeds a predetermined thickness and is rotating in a second direction opposite to said first direction and to feed liquid to said annular body when it is rotating in said first direction.

6. A liquid lubricated roll according to claim 1 wherein said level control means comprises slot and groove means formed in said spools that establish an axial flow of liquid that bypasses said bearings when said spools are rotating.

7. A liquid lubricated roll according to claim 3 wherein said slot and groove means comprises a circumferential groove formed on the outer surface of said spool, at least one slot extending longitudinally across one of said bearing associated with said spool and one end of said slot being in fluid communication with said annular groove, and a second groove extending longitudinally from said annular groove to one end of said spool on the side of said circumferential groove opposite said slot.

8. A liquid lubricated roll according to claim 1 further comprising fluid passage means forming a vent line communicating between said passageway and the atmosphere.

9. A liquid lubricated roll according to claim 8 further comprising means for drying air drawn into said passage from the atmosphere through said vent line.

10. A liquid lubricated roll according to claim 1 wherein said recirculation means includes a pair of recirculation scoops at axially spaced locations on said axle means, said scoops each having a first end in fluid communication with said second conduit means and a second end immersed in said rotating annular body, the second end of each said scoop being aligned with an opposite direction of rotation to develop a fluid motive pressure differential in said fluid flow path.

11. A liquid lubricated roll according to claim 10 wherein said second conduit means includes fluid guiding passages formed in said axle means, and extending between each of said first recirculation scoop ends and openings in a first end of said axle means.

12. A liquid lubricated roll according to claim 11 wherein said fluid flow path includes means for cleaning said liquid.

13. A liquid lubricated roll according to claim 11 wherein said fluid flow path includes means for selectively adding liquid to and draining liquid from said flow path while said spools are rotating.

14. A liquid lubricated roll according to claim 11 wherein said fluid flow path includes means for controlling and metering said flow.

15. In a liquid lubricated roll having an axle means extending generally horizontally, a plurality of bearings axially spaced along said axle means, and a plurality of spools rotatably mounted on said bearings, said spools and said axle means defining therebetween an annular passageway containing said bearings, the improvement comprising, a liquid reservoir, located exterior to said roll and arranged for containing liquid at least the same gravitational level as the longitudinal centerline of said axle means, first conduit means for guiding said liquid from said reservoir to said passageway to form a rotating annular body of liquid against the interior of said spools during their rotation, means for directing liquid from said rotating annular body onto said bearings, means for controlling the level of said rotating annular liquid body along said passageway comprising longitudinally extending channel means formed in said axle means and in fluid communication with said first conduit means and a first plurality of level control scoops arrayed along said axle means with at least one of said level control scoops disposed between adjacent pairs of said bearings, said level control scoops each having a first end in fluid communication with said channel means and a second end adapted to skim from said rotating annular body liquid which exceeds a predetermined thickness and is rotating in a first direction, and a second set of said level control scoops and an associated channel means, formed in said axle means and in fluid communication with said first conduit means, the second ends of said second scoop set adapted to skim liquid from said rotating annular body when it exceeds a predetermined thickness and is rotating in a second direction opposite to said first direction and to feed liquid to said annular body when it is rotating in said first direction, means for preventing an axial flow of liquid by said bearings when said spools are stationary, and means for recirculating said liquid during said rotation along a fluid path including said rotating annular body and second conduit means having both of its ends in fluid communication with said liquid body.

16. A liquid lubricated roll according to claim 15 wherein said fluid flow path includes means for cleaning said liquid.

17. A liquid lubricated roll according to claim 15 wherein said fluid flow path includes means for selectively adding liquid to and draining liquid from said flow path while said spools are rotating.

18. A liquid lubricated roll according to claim 15 wherein said fluid flow path includes means for controlling and metering said flow.

19. A liquid lubricated roll according to claim 15 wherein said fluid flow path includes a heat exchanger.

20. A liquid lubricated roll according to claim 15 further comprising fluid passage means forming a vent line communicating between said passageway and the atmosphere.

21. A liquid lubricated roll according to claim 20 further comprising means for drying air drawn into said passage from the atmosphere through said vent line.

* * * * *